United States Patent [19]
Hayashi et al.

[11] Patent Number: 5,558,126
[45] Date of Patent: Sep. 24, 1996

[54] DOUBLE SOLENOID TYPE ELECTROMAGNETIC VALVE

[75] Inventors: Bunya Hayashi; Makoto Ishikawa, both of Yawara-mura, Japan

[73] Assignee: SMC Corporation, Tokyo, Japan

[21] Appl. No.: 516,763

[22] Filed: Aug. 18, 1995

[30] Foreign Application Priority Data

Nov. 22, 1994 [JP] Japan .................................. 6-312775

[51] Int. Cl.⁶ .................................................. F15B 13/043
[52] U.S. Cl. ................ 137/625.64; 137/269; 137/625.63
[58] Field of Search ............................... 137/269, 625.63, 137/625.64

[56] References Cited

U.S. PATENT DOCUMENTS 5,437,306  8/1995  Asou et al. .................... 137/625.64

*Primary Examiner*—Gerald A. Michalsky
*Attorney, Agent, or Firm*—Oblon, Spivak, McClelland, Maier & Neustadt, P.C.

[57] ABSTRACT

A safe, double solenoid type electromagnetic valve which can be used as a single solenoid type electromagnetic valve and in which a main valve member does not change from one change-over position to another even when electric power is supplied to two pilot valves at the same time. A first piston is disposed at one end of the main valve member while second and third pistons are disposed at the opposite end. The first and second pistons have the same diameter while the third piston is smaller in diameter than the first two. Two solenoid mechanisms are provided for making a pilot fluid operate on the first piston as well as the second and third pistons. A change over device is also provided which is able to change over the operation from a first situation where the pilot fluid is allowed to operate on both the second and third pistons to a second situation wherein the pilot fluid is allowed to work only on the third piston.

4 Claims, 3 Drawing Sheets

DOUBLE SOLENOID TYPE ELECTROMAGNETIC VALVE

TECHNICAL FIELD OF THE INVENTION

The present invention relates to a double solenoid type electromagnetic valve having two electromagnetically operated pilot valves which are each operated by a solenoid mechanism.

PRIOR ART

A double solenoid type electromagnetic valve having two electromagnetically operated pilot valves which are each operated by a solenoid mechanism has heretofore been well known. This type of an electromagnetic valve is generally provided with a main valve member of a spool type for changing over a flowing direction of a main fluid from one to another and also provided with two pistons disposed at both axial ends of the main valve member. It is constructed so that the main valve member is changed over from one operating position to another by turning the two solenoid mechanisms on and off alternately to let a pilot fluid work on the two pistons in an alternate manner.

In such conventional double solenoid type electromagnetic valve, however, since the two pistons, which are located on both sides of the main valve member, are of the same diameter, the main valve member changing-over operation cannot be done by one pilot valve alone, and thus the valve becomes unemployable in the event of trouble of one pilot valve.

Although the main valve member changing-over operation can be done by providing a manual operation mechanism and by operating one pilot valve and the manual operation mechanism, it is required that the pilot valve and the manual operation mechanism be operated in an alternate manner, so the operation is very complicated and it is difficult to time the operation properly. Thus, the main valve member changing-over operation cannot be done simply by turning one pilot valve on and off like a single solenoid type electromagnetic valve.

In view of the above point, the present inventors have previously proposed a double solenoid type electromagnetic valve having two pistons of different diameters disposed on both sides of a main valve member, as described in Japanese Utility Model Laid Open No. 96654/93. In this proposed valve, one pilot valve is turned on or off to supply or discharge a pilot fluid to the large-diameter piston side while a pilot fluid pressure is kept operated on the small-diameter piston side by means of a manual operation device, and thus the main valve member changing-over operation can be done by a similar operation to that in a single solenoid type electromagnetic valve.

However, in the case where the above improved type electromagnetic valve is applied to its originally intended use, that is, used as a double solenoid type electromagnetic valve, for example in a change-over condition wherein electric power is supplied to one pilot valve and the pilot fluid is fed to the small-diameter piston side, if electric power should be supplied double to the other pilot valve due to malfunction or the like of a control system, the pilot fluid is fed also to the large-diameter piston side, and so there is a fear that the main valve member may undergo a change-over operation due to a difference in the pressure receiving area between the two pistons.

DISCLOSURE OF THE INVENTION

The subject to be attained by the present invention is to construct a double solenoid type electromagnetic valve having two pilot valves of an electromagnetically operated type in such a manner that the electromagnetic valve can be used by a similar operation to that in a single solenoid type electromagnetic valve, using one pilot valve, and that even if electric power should be supplied double to the two pilot valves erroneously in the case of using as a double solenoid type electromagnetic valve, a main valve member does not undergo a change-over operation.

In order to achieve the above-mentioned subject, the double solenoid type electromagnetic valve of the present invention includes:

a main valve portion having a main valve member for changing over a main fluid from one flowing direction to another, the main valve member being disposed slidably within a valve hole, a first piston disposed at one axial end of the main valve member, and second and third pistons which are disposed in series at the opposite end of the main valve member, the first and second pistons having the same diameter, the third piston being smaller in diameter than the first and second pistons, the main valve member being changed over from one change over position to another by means of the above pistons which are driven with a pilot fluid;

a pilot valve portion having two, first and second solenoid mechanisms, with the pilot fluid being allowed to operate separately on the first piston and the second and third pistons by operation of those solenoid mechanisms; and a change-over device capable of effecting change-over between a first change-over position in which the pilot fluid fed to the second and third pistons operates on both second and third pistons and a second change-over position in which the pilot fluid operates on only the third piston of a smaller diameter.

According to one preferred mode of embodiment of the present invention, the second and third pistons are separate from each other and can move into contact with and away from each other.

According to another preferred mode of embodiment of the present inventions, the second and third pistons are coupled together.

In the present invention, a manual operation device for manually changing over the pilot-fluid from one flowing direction to another may be provided correspondingly to at least one of the first and second solenoid mechanisms.

By operating the change-over device to keep the pilot fluid operated on the third piston of a small diameter and by turning one solenoid mechanism on and off to supply and discharge the pilot fluid with respect to the first piston of a large diameter, the main valve member can be changed over in a manner similar to that in the case of a single solenoid type electromagnetic valve.

By deactuating the change-over device, the electromagnetic valve can be used as the originally intended double solenoid type electromagnetic valve. That is, by turning the two solenoid mechanisms on and off alternately to supply or discharge the pilot fluid alternately to the first piston side and the second and third piston side, the main valve member can be changed over.

In this case, even if the pilot fluid is supplied to both first piston side and second and third piston side by erroneous supply of electric power double to the two solenoid mechanisms, the change-over operation of the main valve member is not performed because the pressure receiving area of the first piston side and that of the second and third piston side are equal to each other.

DETAILED DESCRIPTION

Figure 1:
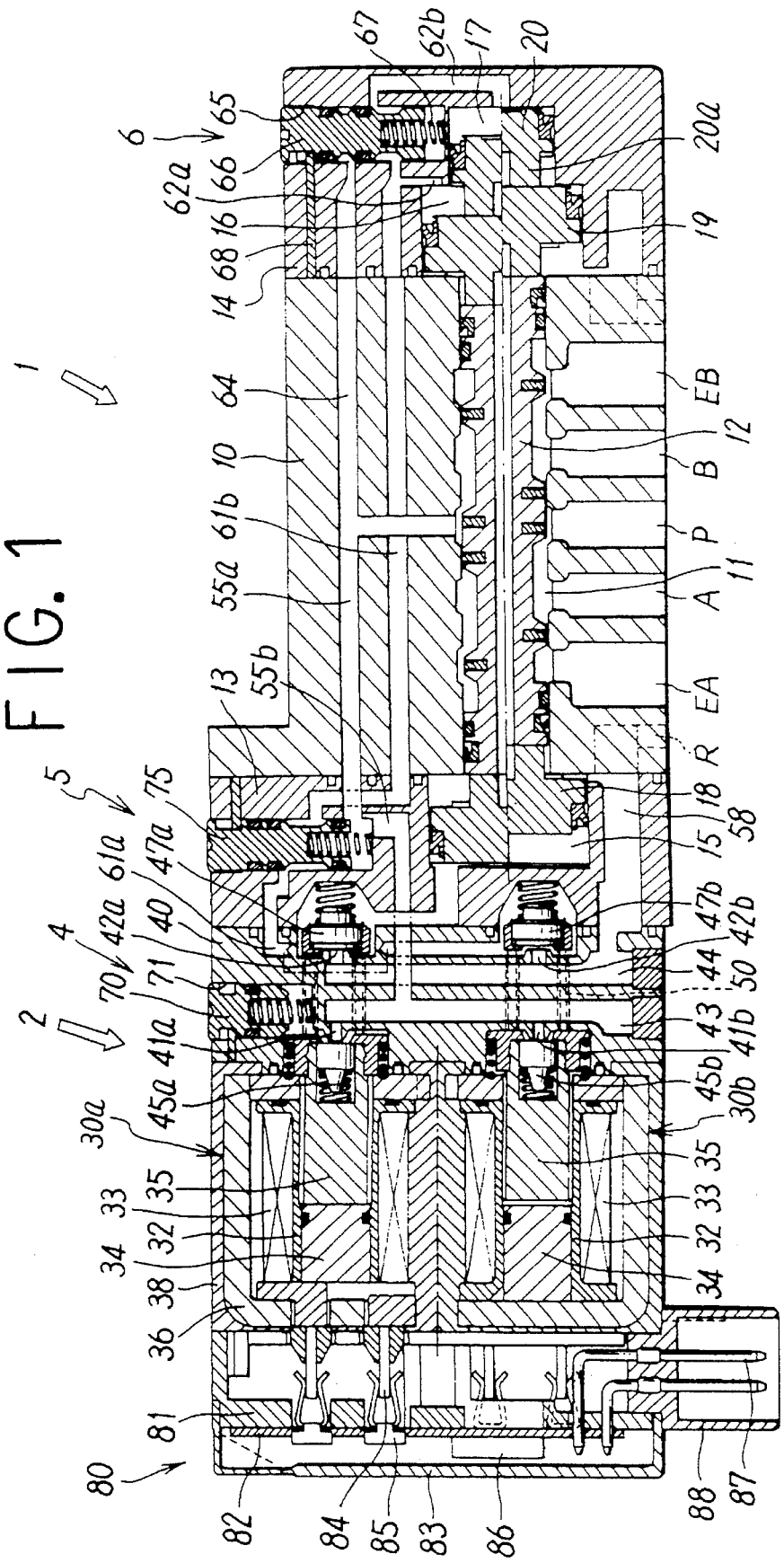
FIG. 1 is a sectional view of a double solenoid type electromagnetic valve according to an embodiment of the present invention.
Figure 2:
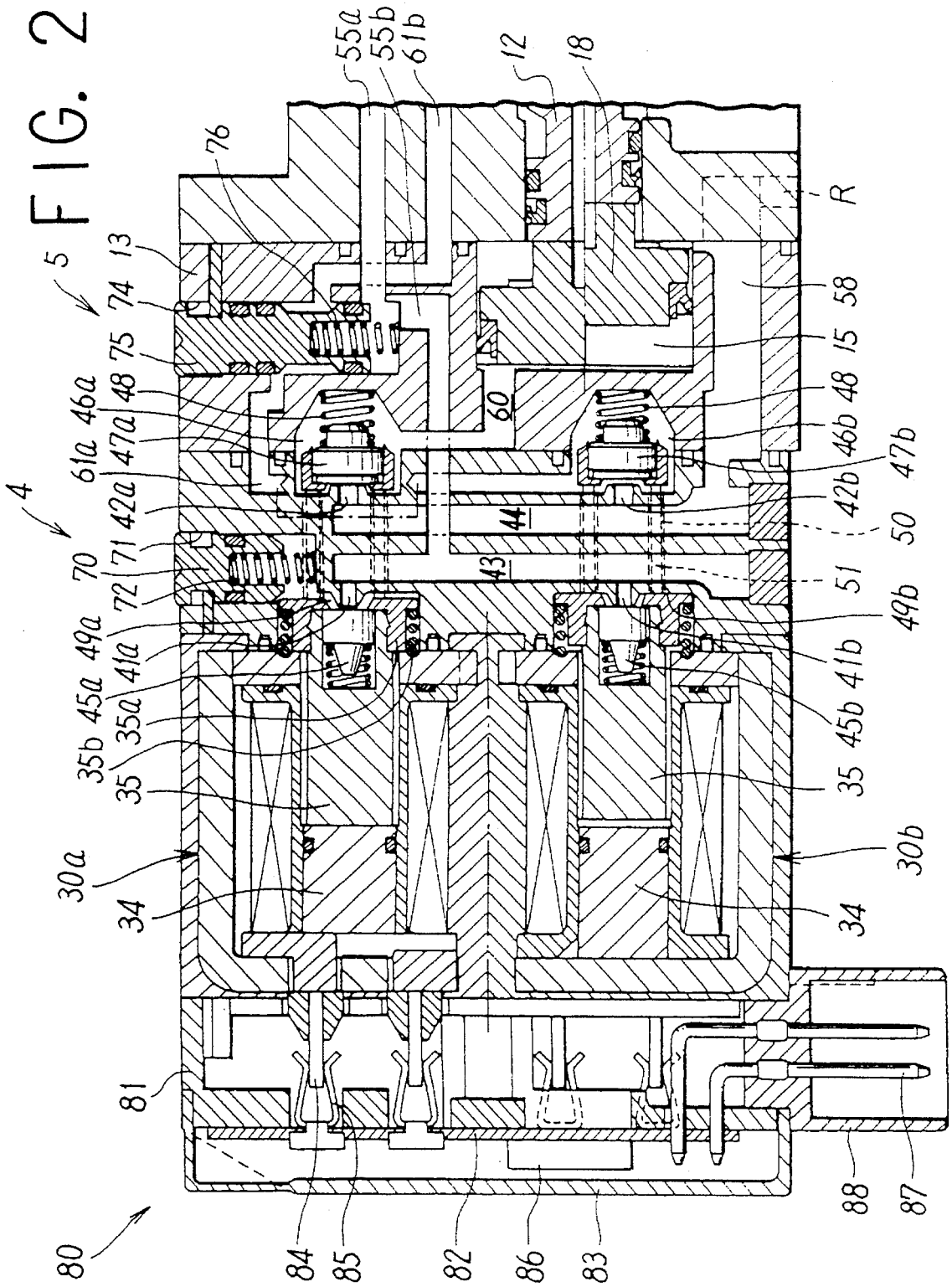
FIG. 2 is an enlarged view of a principal portion of a change-over valve shown in FIG. 1.
Figure 3:
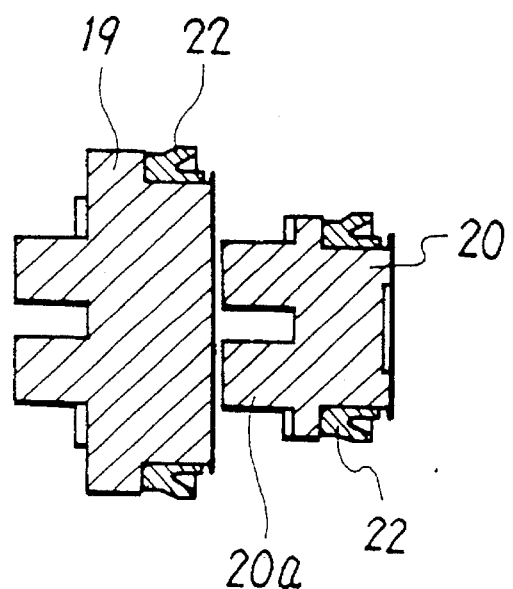
FIG. 3 is a side view showing second and third pistons of a separation type.

FIGS. 1 to 3 illustrate a double solenoid type electromagnetic valve according to an embodiment of the present invention. The double solenoid type electromagnetic valve illustrated therein comprises a main valve portion 1 for changing over a main fluid, e.g. compressed air, from one flowing direction to another, and a pilot valve portion 2 for controlling a pilot fluid.

The main valve portion 1 has a valve body 10 which is generally in the shape of rectangular parallelepiped. In the valve body 10 are provided main fluid flowing input port P, output ports A, B and discharge ports EA, EB, as well as a valve hole 11 for communication of these ports. Into the valve hole 11 is inserted a spool type main valve member 12 in an axially slidable manner so that the flowing direction of the main fluid flowing between the above ports can be changed over from one to another.

To both ends of the valve body 10 are attached first and second end plates 13, 14 which are each in the shape of a block of rectangular parallelepiped. In the end plates 13 and 14 are formed a first piston chamber 15 and a second piston chamber 16, respectively, so as to face both ends of the valve hole 11, and a third piston chamber 17 is formed outside the second piston chamber 16 in series and adjacently. These three piston chambers are in such a dimensional relation that the first and second piston chambers 15, 16 are of the same diameter and the third piston chamber 17 is of a smaller diameter.

Within the first to third piston chambers 15, 16 and 17 are disposed first, second and third pistons 18, 19, 20, respectively, in an axially slidable manner, the first and second pistons 18, 19 having the same diameter and the third piston 20 having a smaller diameter. As shown in FIG. 3, the second and third pistons 19, 20 are formed as separate members from each other, and a shaft portion 20a of the third piston 20 can move into contact with and away from the back of the second piston 19. The numeral 22 in the same figure denotes a packing.

The pilot valve portion 2 is provided with two, first and second solenoid mechanisms 30a, 30b. The solenoid mechanisms 30a and 30b each comprise a coil 33 wound round a bobbin 32 of a non-magnetic material, a fixed iron core 34 which is fixed within a central iron core chamber of the bobbin 32, a movable iron core 35 which is axially movable within the iron core chamber, and a magnetic frame 36 of a magnetic material which surrounds those components. The outer periphery exclusive of the mounted side of a pilot valve body 40 is molded with an insulating material such as a synthetic resin for example.

It is optional whether the two solenoid mechanisms 30a and 30b are to be formed integrally as one piece or coupled together separably. In the latter case, it is desirable that both solenoid mechanisms 30a and 30b be formed so as to have the same structure and same external form and then coupled together separably by means of a suitable connecting mechanism comprising a projection and a recess which are formed on their joint surfaces. By so doing, in the event of failure of one solenoid mechanism, this faulty mechanism alone can be replaced with a new one.

In the pilot valve body 40 are provided two pilot supply valve seats 41a, 41b, two pilot discharge valve seats 42a, 42b positioned coaxially with the valve seats 41a, 41b and opening in the reverse direction, a pilot common input path 43 which is in communication with the valve seats 41a and 41b, and a pilot common discharge path 44 which is in communication with the valve seats 42a and 42b. The pilot supply valve seats 41a and 41b are opened and closed by pilot supply valve members 45a and 45b which are held in the movable iron core 35, while the pilot discharge valve seats 42a and 42b are opened and closed by pilot discharge valve members 47a and 47b which are disposed within discharge valve chambers 46a and 46b formed between the pilot valve body 40 and the first end plate 13.

The pilot supply valve members 45a and 45b are held in the movable iron core 35 by means of a valve holder 35a fixed to the front end of the movable iron core 35 and are urged in a direction to close the pilot supply valve seats 41a and 41b by means of a spring 35b which is mounted in a compressed state between the valve holder 35a and the magnetic frame 36. On the other hand, the pilot discharge valve members 47a and 47b are urged in a direction to close the pilot discharge valve seats 42a and 42b by means of a spring 48. Supply valve chambers 49a, 49b and discharge valve chambers 46a, 46b with valve members 45a, 45b and 47a, 47b being accommodated therein are in communication with each other through a communication path 50, and into the communication path 50 is loosely inserted a valve stem 51 which opens and closes the pilot discharge valve members 47a and 47b in interlock with the pilot supply valve members 45a and 45b.

When the pilot supply valve members 45a and 45b are closed, the valve stem 51 presses the pilot discharge valve members 47a and 47b against the spring 48 to open them, while the valve members 45a and 45b are open, the valve stem allows the valve members 47a and 47b to be closed under the biasing force of the spring 48. Therefore, when the movable iron core 35 is attracted to the fixed iron core 34 upon energization of the solenoid mechanisms 30a and 30b, the pilot supply valve members 45a and 45b open the pilot supply valve seats 41a and 41b, while the pilot discharge valve members 47a and 47b close the pilot discharge valve seats 42a and 42b. On the other hand, when the movable iron core 35 moves away from the fixed iron core 34 upon deenergization of the solenoid mechanisms 30a and 30b, the valve members 45a and 45b close the valve seats 41a and 41b, while the valve members 47a and 47b open the valve seats 42a and 42b.

The pilot common input path 43 is in communication with the input port P through a pilot supply flow path 55b, further through a second manual operation device 5 provided in the first end plate 13 and a pilot supply flow path 55a, while the pilot common discharge path 44 is in communication with a pilot discharge port R through a pilot discharge flow path 58.

The discharge valve chamber 46a on the first solenoid mechanism 30a is in communication with the first piston chamber 15 through a first pilot output flow path 60, while the discharge valve chamber 46b on the second solenoid mechanism 30b side is in direct communication with the second piston chamber 16 through a second pilot output flow path 61a, the second manual operation device 5, a second pilot output flow path 61b and further through a branch flow path 62a and is also in communication with the third piston chamber 17 through a change-over device 6 provided in the second end plate 14 and further through a branch flow path 62b.

In the change-over device 6, an operating shaft 66 is inserted axially movably into a hole 65 to which are open a pilot supply flow path 64 extending from the input port P as well as the second pilot output flow path 61b and branch flow path 62b, the operating shaft 66 functioning to change over the state of communication of those flow paths from one to another and being urged in a projecting direction from the hole 65 by means of a spring 67 mounted at the bottom of the hole. When the operating shaft 66 is pushed up by virtue of the spring 67 and assumes a first change-over position shown in FIG. 1, the pilot supply flow path 64 is cut off and the pilot output flow path 61b and the branch flow path 62b are in communication with each other. On the other hand, when the operating shaft 66 is pushed down against the biasing force of the spring 67 and assumes a second change-over position, the pilot supply flow path 64 comes into communication with the branch flow path 62b and the pilot output flow path 61b comes into communication with the second piston chamber 16 through the branch flow path 62a. The operating shaft 66 can be locked in its operating position (second change-over position). The numeral 68 in FIG. 1 denotes a stopper for restricting a depressed position of the operating shaft 66.

In the pilot valve body 40 and the first end plate 13 are provided two, first and second manual operation devices 4, 5 in correspondence to the first and second solenoid mechanisms 30a, 30b so that the change-over operation of the main valve member 12 can be done manually in the event of inoperativeness of the solenoid mechanisms 30a and 30b due to a power failure for example.

The first manual operation device 4, which is in a corresponding relation to the first solenoid mechanism 30a, is provided with an operating shaft 70 having a tapered front end portion. The operating shaft 70 is inserted axially movably into a hole 71 and is urged in a projecting direction from the hole by means of a spring 72.

In the first manual operation device 4, when the operating shaft 70 is pushed up by virtue of the spring 72 and assumes its change-over position shown in FIG. 1, the front end portion thereof is spaced away from the movable iron core 35 of the first solenoid mechanism 30a. On the other hand, when the operating shaft 70 is pushed in against the spring 72, a side face portion of its front end comes into abutment with the movable iron core 35 which closes the pilot supply valve seat 41a and causes the movable iron core to move backward, resulting in that the valve seat 41a is opened. This is substantially the same as the state of operation performed when the first solenoid mechanism 30a is energized. Upon release of the operating shaft 70, the shaft 70 reverts to its original state under the biasing force of the spring 72, thereby releasing the movable iron core 35, so that the valve seat 41a is closed.

A modification may be made so that the operating shaft 70 can be locked in its operating position (depressed position).

In the second manual operation device 5, which is in correspondence to the second solenoid mechanism 30b, an operating shaft 75 is inserted axially movably into a hole 74 to which the pilot supply flow paths 55a, 55b and the pilot output flow paths 61a, 61b are open, the operating shaft 75 functioning to change over the state of communication of those flow paths from one to another and being urged in a projecting direction from the hole 74 by means of a spring 76.

In the second manual operation device 5, when the operating shaft 75 is raised by virtue of the spring 76 and assumes a change-over position thereof shown in FIG. 1, the pilot supply flow paths 55a and 55b are in communication with each other and communication is also provided between the input port P and the pilot common input path 43; further, the pilot output flow paths 61a and 61b are in communication with each other, and communication is attained also between the discharge valve chamber 46b on the second solenoid mechanism 30b side and the second and third piston chambers 16, 17. Upon depression of the operating shaft 75 against the spring 76, the state of communication of the above flow paths is changed by the operating shaft 75, with the result that the pilot supply flow path 55a and the pilot output flow path 61b come into communication with each other, with communication being also attained between the input port P and the second and third piston chambers 16, 17, and the pilot output flow path 61a is cut off. This is substantially the same as the state of operation performed upon energization of the second solenoid mechanism 30b. The operating shaft 75, Upon release thereof, reverts to its original state under the biasing force of the spring 76, whereby the state of communication of each flow path is changed as in FIG. 1.

A modification may be made so as to permit the operating shaft 75 to be locked in its operative position (depressed position).

A power supply means 80 for the supply of electric power to the first and second solenoid mechanisms 30a, 30b is attached to the pilot valve portion 2. The power supply means 80 has a terminal base 81 attached to the solenoid mechanisms 30a and 30b by a suitable means such as bolting, a terminal board 82 held by the terminal base 81 and a terminal cover 83 which covers the terminal board 82.

The terminal board 82 with wiring printed on the surface thereof has electric devices 86 such as a pilot lamp and a counter electromotive force preventing device in addition to the same number of power supply terminals 85 as the number of power receiving terminals 84 projecting from the solenoid mechanisms 30a and 30b. A terminal box 88 having plug terminals 87 for connection to a power source is mounted removably to the lower end portion of the terminal board 82 by a suitable means such as, for example, inserting the front end portions of the plug terminals 87 into holes formed in the terminal board 82.

The terminal cover 83 which covers the terminal board 82 has a plurality of retaining holes formed in the side face thereof, and by engagement of retaining pawls formed on the outer side face of the terminal base 81 with those retaining holes, the terminal cover 83 is mounted removably to the terminal base 81.

The operation of the double solenoid type electromagnetic valve having the above construction will be described below in detail.

(1) In the case where the first and second manual operation devices 4, 5 and the change-over device 6 are not operated and assume the respective change-over positions in FIG. 1 and the first and second solenoid mechanisms 30a, 30b are not energized:

By closing of the pilot supply valve seats 41a and 41b the pilot fluid from the input port P is cut off, while by opening of the pilot discharge valve seats 42a and 42b the first to third piston chambers 15 to 17 are all in communication with the pilot discharge port R from the valve seats 42a and 42b through the pilot common discharge path 44. Therefore, the main valve member 12 is at standstill in an change-over position.

(2) In the case where the first and second manual operation devices 4, 5 and the change-over device 6 are not operated and assume the respective change-over positions in FIG. 1 and the first solenoid mechanism 30a is energized:

Since the pilot supply valve seat 41a opens and the pilot discharge valve seat 42a closes, the pilot fluid from the input port P flows from the pilot common input path 43 into the first piston chamber 15 through the valve seat 41a, communication path 50, discharge valve chamber 46a and first pilot output flow path 60 and pushes the first piston 18 rightwards in the figure. At the same time, the main valve member 12 is also pushed by the first piston 18 and moves rightwards into the first change-over position shown in the lower half of FIG. 1.

(3) In the case where the first and second manual operation devices 4, 5 are not operated and assume the respective change-over positions in FIG. 1 and the second solenoid mechanism 30b is energized:

Since the pilot supply valve seat 41b opens and the pilot discharge valve seat 42b closes, the pilot fluid from the input port P flows from the pilot common input path 43 into both second and third piston chambers 16, 17 through the valve seat 41b, communication path 50, discharge valve chamber 46b, second pilot output flow paths 61a, 61b and branch flow paths 62a, 62b and pushes the second piston 19 leftwards in the figure. At the same time, the main valve member 12 is also pushed by the second piston 19 and moves leftwards into the second change-over position shown in the upper half of FIG. 1.

At this time, the third piston 20 does not move because the pressure of the pilot fluid which has entered the second piston chamber 16 and that of the pilot fluid which has entered the third piston chamber 17 act equally on both faces of the third piston.

Thus, the electromagnetic valve can be used as the originally intended double solenoid type electromagnetic valve by change-over operation between the two solenoid mechanisms 30a and 30b as in the above (2) and (3).

(4) In the case where the second solenoid mechanism 30b is also energized while keeping the first solenoid mechanism 30a energized as in the above (2):

Like the above case (3), the pilot fluid flows into both second and third piston chambers 16, 17, but since the pressure receiving area of the second piston 19 is equal to that of the first piston 18, the hydraulic forces acting on both sides of the main valve member 12 through the pistons 18 and 19 are equal to each other and hence the main valve member 12 retains its original position without change-over.

(5) In the case where the first solenoid mechanism 30a is also energized while keeping the second solenoid mechanism 30b energized as in the above (3):

Like the above case (2), the pilot fluid flows into the first piston chamber 15, but since the pressure receiving area of the first piston 18 and that of the second piston 19 are equal to each other, the hydraulic forces acting on both sides of the main valve member 12 through those pistons are equal to each other and hence the main valve member 12 retains its original position without change-over.

(6) In the case where the first and second manual operation devices 4, 5 are not operated and assume their change-over positions in FIG. 1 and with neither the first solenoid mechanism 30a nor the second 30b energized, the operating shaft 66 of the change-over device 6 is depressed:

Since the pilot supply flow path 64 and the branch flow path 62b come into communication with each other, the pilot fluid from the input port P flows into the third piston chamber 17 through the flow paths 64 and 62b and the main valve member 12 is pushed leftwards by the third piston 20 through the second piston 19, so that the main valve member 12 is changed over to its second change-over position shown in the upper half of FIG. 1.

(7) In the case where the first solenoid mechanism 30a is energized with the operating shaft 66 of the change-over device 6 locked in its operative state in the above (6):

Like the above (2), the pilot fluid flows into the first piston chamber 15, but since the pressure receiving area of the first piston 18 is larger than that of the third piston 20, the working force of the first piston 18 is larger than that of the third piston 20, so that the main valve member 12 is pushed by the first piston 18 and moves rightwards in FIG. 1 into its first change-over position shown in the lower half of the same figure.

If the first solenoid mechanism 30a is deenergized in this state, the pilot supply valve seat 41a closes and the pilot discharge valve seat 42a opens, so that the first piston chamber 15 comes into communication with the pilot discharge port R through the valve seat 42a and further through the pilot common discharge path 44, whereby the main valve member 12 is pushed by the third piston 20 and is changed over to its second change-over position shown in the upper half of FIG. 1.

Therefore, when the change-over device 6 is operated, the change-over operation of the main valve member 12 can be effected in the same manner as in the case of a single solenoid type electromagnetic valve by turning on and off the first solenoid mechanism 30a alone without using the second solenoid mechanism 30b.

As to the operations of the first and second manual operation devices 4, 5, as mentioned above, the first manual operation device 4 reproduces substantially the same operational state as in the case where the first solenoid mechanism 30a is energized, while the second manual operation device 5 reproduces substantially the same operational state as in the case where the second solenoid mechanism 3 is energized. So repeated explanations of those operations are here omitted.

The change-over device 6 makes change-over of the electromagnetic valve between the double solenoid operating method and the single solenoid operating method, and upon operation thereof the third piston 20 operates so as to change over the main valve member 12 in the lefthand direction. Thus, the change-over device 6 has substantially the same function as that of the second manual operation device 5 and therefore the second manual operation device 5 may be omitted as the case may be.

Figure 4:
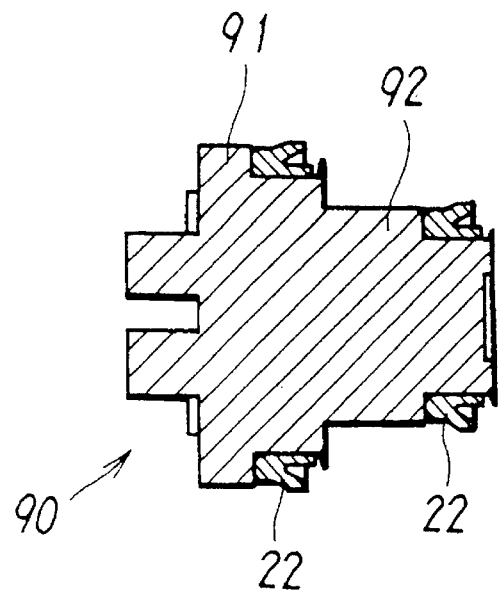
FIG. 4 is a side view showing second and third pistons of an integral type.

Although in the above embodiment the second and third pistons 19, 20 are constructed as separate type pistons, both may be formed integrally with each other. In FIG. 4 there is shown an integral type piston 90 comprising a second piston 91 of a large diameter and a third piston 92 of a small diameter which are coupled together. In the integral type piston 90, the sum of a pressure receiving area of the second piston 91 and that of the third piston 92, (total pressure receiving area), is equal to the pressure receiving area of the first piston 18 located on the side opposite to the main valve member 12. It goes without saying that such shapes of second and third pistons 19, 20 as shown in FIG. 3 may be coupled together.

The integral type piston 90 is different from the above separation type only in that the second and third pistons 91, 92 move always integrally as one piece, and the other operations are substantially the same as in the separation type.

It is needless to say that the present invention is not limited to the structure of the above embodiment but that various modifications may be made within the scope in which the object of the invention can be achieved.

As set forth hereinabove, by operating the change-over device, the double solenoid type electromagnetic valve of the present invention can be used as a single solenoid type electromagnetic valve wherein the change-over operation of the main valve member is performed with only one solenoid mechanism. Further, in the case where the change-over device is turned off for use of the electromagnetic valve as the originally intended double solenoid type electromagnetic valve, even in the event electric power should be supplied double to the two solenoid mechanisms by mistake, a high safety can be ensured because the change-over operation of the main valve member is not performed.

What is claimed is:

1. A double solenoid type electromagnetic valve including:

a main valve portion having a main valve member for changing over a main fluid from one flowing direction to another, said main valve member being disposed slidably within a valve hole, also having a first piston disposed at one axial end of said main valve member, and further having second and third pistons which are disposed in series at the opposite end of said main valve member, said first and second pistons having the same diameter, said third piston being smaller in diameter than the first and second pistons, said main valve member being changed over from one change-over position to another by means of said pistons which are driven with a pilot fluid;

a pilot valve portion having two, first and second solenoid mechanisms, with the pilot fluid being allowed to operate separately on said first piston and said second and third pistons by operation of said solenoid mechanisms; and a change-over device capable of effecting change-over between a first change-over position in which the pilot fluid fed to said second and third pistons operates on both second and third pistons and a second change-over position in which the pilot fluid operates on only the third piston of a smaller diameter.

2. A double solenoid type electromagnetic valve according to claim 1, wherein said second and third pistons are separate from each other and can move into contact with and away from each other.

3. A double solenoid type electromagnetic valve according to claim 1, wherein said second and third pistons are coupled together.

4. A double solenoid type electromagnetic valve according to any of claims 1 to 3, wherein a manual operation device for manually changing over the pilot fluid from one flowing direction to another is provided correspondingly to at least one of said first and second solenoid mechanisms.

* * * * *